June 17, 1930.    C. C. SPREEN    1,764,701
BEARING SEAL
Filed Dec. 30, 1926
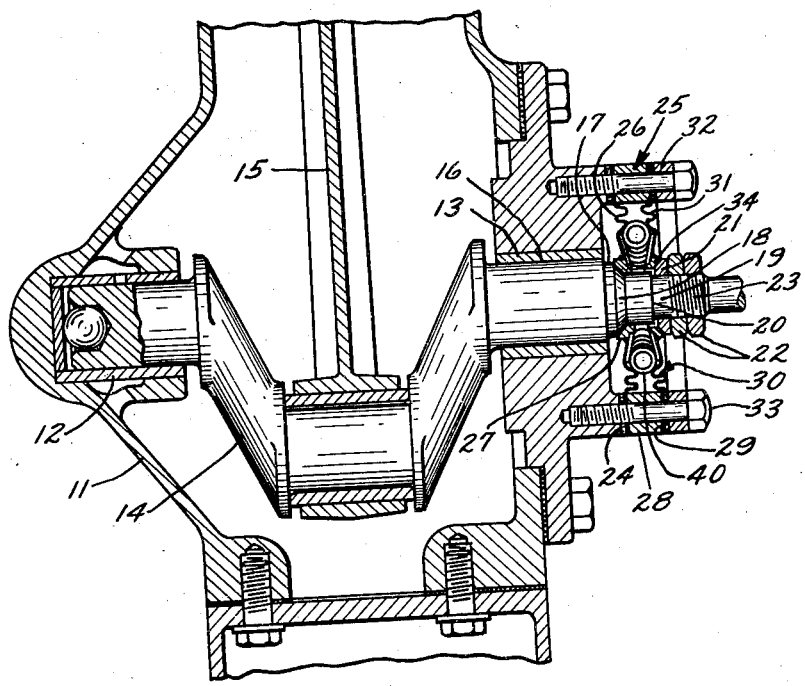
CHARLES C. SPREEN
Inventor
By Smith and Freeman
Attorneys Patented June 17, 1930

1,764,701

UNITED STATES PATENT OFFICE

CHARLES C. SPREEN, OF DETROIT, MICHIGAN

BEARING SEAL

Application filed December 30, 1926. Serial No. 157,935.

My invention relates to bearing seals, and particularly to means for sealing the drive shaft aperture in the casing of a refrigerant compressor, and the principal object of my invention is to provide new and improved means for this purpose. In the drawings accompanying this specification and forming a part of this application I have shown, for purposes of illustration, one form which my invention may assume, and in these drawings the single figure is a fragmentary central vertical section through a compressor showing the embodiment of my invention herein disclosed.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15. The crank shaft projects beyond the open-end bearing 13 through a suitable aperture 16 in a casing plate 35, and is provided exteriorly of the casing plate 35 with a reduced extension 17 forming an annular shoulder 18, and with a second reduced extension 19 forming a second annular shoulder 20, adapted to receive a suitable driving connection, not shown. The crank shaft carries a flange 21 secured against the shoulder 20 by means of nuts 22 cooperating with a screw-threaded section 23 found on the further extension 19. The casing plate 35 is provided with an annular casing plate seat 24 surrounding the aperture 16 and the crank shaft 14 passing therethrough.

Closing the aperture 16, particularly to prevent both the egress of refrigerant and the ingress of moisture, is a seal 25 herein shown as comprising a generally radial flexible annular diaphragm 26 corrugated to increase its flexibility, having its inner end secured to a base 27 adapted to be held in rotary sealing engagement with the annular shoulder 18, and having its periphery sealed to the casing plate seat 24 by means of a spacer member 28 secured to the casing seat 24 with the outer periphery of the diaphragm 26 disposed therebetween. The spacer member 28 is provided on its outer face with a seat 29.

Closing the aperture between the base 27 and the shoulder 18, particularly to further prevent both the egress of refrigerant and the ingress of moisture, is a seal 30 herein shown as comprising a generally radial flexible annular diaphragm 31 corrugated to increase its flexiblity, having its outer periphery sealed to the spacer seat 29 by means of a securing ring 32 secured to the spacer member 28 with the periphery of the diaphragm 31 disposed therebetween. The spacer member 28 and the securing ring 32 fixedly retain the seal structures; by means of suitable securing bolts 33 passing through the securing ring 32 and the spacer member 28 into the annular casing plate seat 24. The diaphragm 31 is secured at its inner edge to a base 34 held in rotary sealing engagement against the shaft flange 21 by means of a helical spring 40 interposed of toroidal formation between the diaphragms 26 and 31 which acts upon the two diaphragms to simultaneously urge the base 27 into sealing engagement with the shoulder 18 and the base 34 into sealing engagement with the flange 21.

From the above description it will be obvious to those skilled in the art that I have provided a seal tightly doubly sealing the shaft aperture in the casing.

Under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:

The combination with a shaft rotatably mounted in a journal bearing, of a pair of opposed annular bearing seats associated with the shaft, a pair of thrust rings disposed in abutting relation against such bearing seats, said rings being provided with diverging annular guide plates, an expanded helical spring of toroidal formation disposed between the guide plates for urging the rings against the aforesaid seats, and a pair of resilient diaphragms secured in sealed relation between the rings and an annular projecting portion of the aforesaid journal bearing.

In testimony whereof I herunto affix my signature.

CHARLES C. SPREEN.